No. 748,367. Patented December 29, 1903.

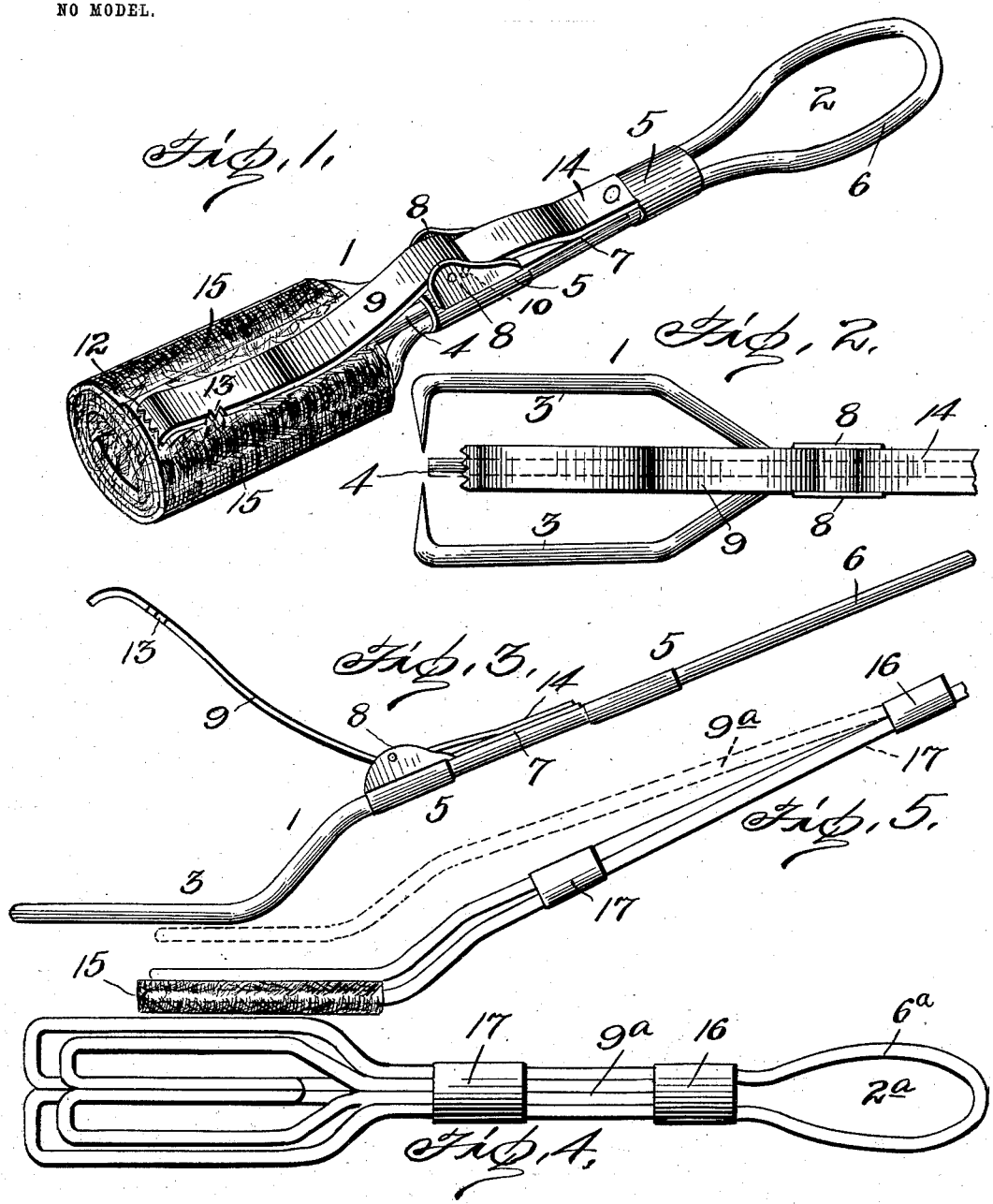

UNITED STATES PATENT OFFICE.

CHARLOTTE H. HAIGHT, OF OSWEGO, ILLINOIS.

GRIDDLE-GREASER.

SPECIFICATION forming part of Letters Patent No. 748,367, dated December 29, 1903.

Application filed April 30, 1903. Serial No. 154,997. (No model.)

*To all whom it may concern:*

Be it known that I, CHARLOTTE H. HAIGHT, a citizen of the United States, residing at Oswego, in the county of Kendall and State of Illinois, have invented certain new and useful Improvements in Griddle-Greasers; and I do declare the following to be a full, clear, and exact description of the invention, such as will enable others skilled in the art to which it appertains to make and use the same.

This invention relates to improvements in griddle-greasers.

The object of the invention is to provide means for holding the greasing cloths or material for greasing griddles and other cooking utensils to prevent soiling of the fingers.

A further object is to provide a device of this character from which the grease-holding material may be easily removed for renewal and which will be simple in construction, cheaply produced, and well adapted to the use for which it is designed.

With these and other objects in view the invention consists of certain novel features of construction, combination, and arrangement of parts, as will be more fully described, and particularly pointed out in the appended claims.

Figure 1 is a perspective view of the device, showing the greasing-cloth in place. Fig. 2 is a top plan view of the same with the cloth removed. Fig. 3 is a side elevation of the same, showing the parts opened for the application of the cloth. Fig. 4 is a top plan view of a modified form of holder. Fig. 5 is a side elevation of the same, showing the open position of the parts in broken lines.

In the drawings, referring more particularly to Figs. 1, 2, and 3, the numeral 1 denotes the holder, which may be made of any suitable material and in various designs and shapes. In the present instance the holder is shown as constructed of wire and in the shape of a fork and is formed by bending a piece of wire upon itself to form a loop 2. The ends 3 are then brought together, and between them is inserted a second strip of wire 4. These parts are held together by means of clamping-bands 5 and form the handle 6 of the holder. The ends 3 and wire piece 4 immediately below the lower band 5 are now bent into the shape and form of the tine end of a fork, the ends 3 extending beyond the end of the piece 4 and are bent inwardly and pointed, as shown in Fig. 2. The outer end of the tine 4 is proximate to the inturned ends of the tines 3, said tine 4 and said inturned ends of the tines 3 converging, as shown in Fig. 2. 7 denotes a plate soldered or otherwise secured to the handle 6, and on said plate are formed upwardly-projecting ears or lugs 8, between which is pivoted one end of a curved spring-arm 9, the pivoted end of which is bent inwardly to form a lug 10 and the opposite end of which is turned or bent inwardly and has formed thereon teeth 12. On one side of the arm are also formed teeth 13. 14 denotes a flat leaf-spring, one end of which is fixed to the handle 6 and the opposite end is adapted to bear under the lug 10 on the arm 9 to hold the same down. 15 denotes the cloth, which is adapted to be wrapped around the tine end of the holder, as shown in Fig. 1, and to be held in position by means of the toothed end of the arm 9. It will be understood that the inturned ends of the tines 3 coact with the tine 4 to prevent the cloth from slipping off said tines and that the spring-pressed arm 9 serves to retain the cloth in a rolled condition and prevents the cloth from casually unrolling and becoming loosened on the tines. To remove the cloth for renewal or other purposes, it is simply necessary to raise the arm 9, as shown in Fig. 3, and unwrap the cloth from the tine end of the holder.

In the form of holder shown in Figs. 4 and 5 the handle portion is formed similar to that of the first form, and consists of a single piece of wire bent to form a loop $2^a$, the ends being then bent to form the handle portion $6^a$. The ends are now bent to form the tine end, then bent laterally toward each other, then back and upwardly between the parts which form the handle portion, the return ends of the wire being soldered together and to the handle portion $6^a$. 16 denotes a socket formed on the handle portion $6^a$, and into said socket is adapted to be inserted the end of a spring-arm $9^a$, which is constructed of wire, the outer end being similar in shape and form to the tine portion of the handle. 17 denotes a band or slide arranged upon and embracing the handle $6^a$ and the upper part of the spring-arm 9ª and is adapted to be slid along these parts to force the same together. In this form of the device the cloth or greasing material is wrapped around the tine end of the holder, and the end of the spring-arm 9ª is forced down upon the same and held by the sliding band 17.

While the holder has been described, and shown in the drawings as being formed of wire, it is obvious that the same may be stamped or cast from metal and may be made in any desirable or suitable design or shape.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. An implement of the class described, comprising a handle having a pair of tines at one end, provided with inturned points at their outer ends disposed in line with each other, a straight tine of less length than the first-mentioned tines and disposed between them, with its outer end proximate to their inturned points, and a spring-arm carried by the handle to coact with the tines to secure a cloth between them, the inturned ends of the outer tines coacting with the intermediate tine to prevent the cloth from slipping from them.

2. An implement of the class described, comprising a handle having tines at one end, provided with angularly-disposed engaging points, and a spring-arm to coact with the tines, in combination with a cloth rolled on the said tines, engaged by the points thereof to prevent slipping therefrom and engaged by the spring-arm to prevent the cloth from unrolling.

In testimony whereof I have hereunto set my hand in presence of two subscribing witnesses.

CHARLOTTE H. HAIGHT.

Witnesses:
SCOTT C. CUTLER,
J. R. WALKER.